No. 733,209. PATENTED JULY 7, 1903.
J. P. IHART.
WATER HEATER.
APPLICATION FILED AUG. 28, 1902.
NO MODEL.
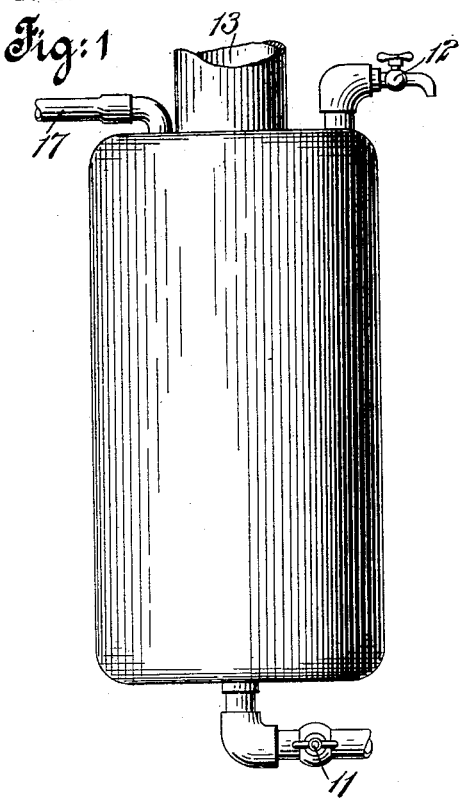
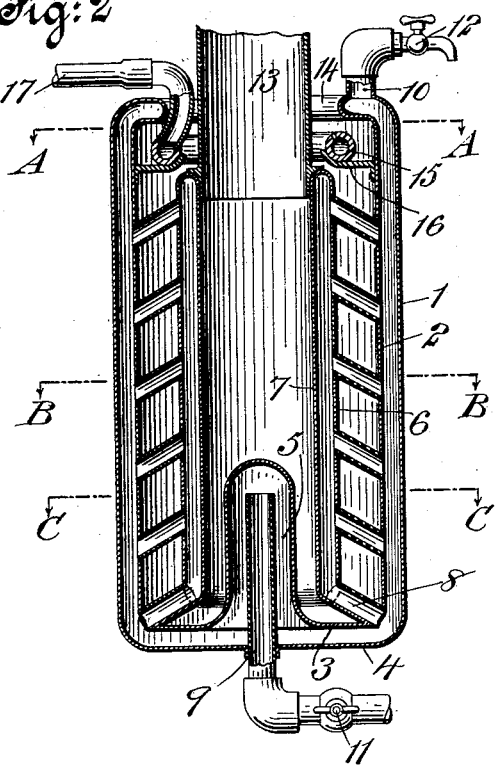
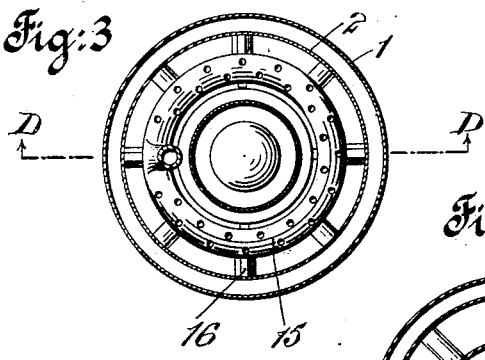
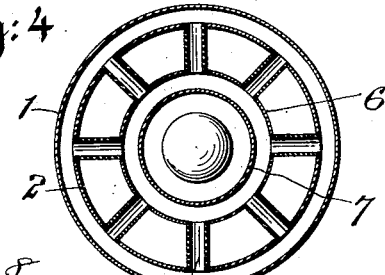
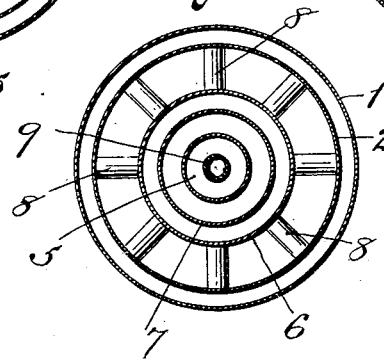

No. 733,209. Patented July 7, 1903.

UNITED STATES PATENT OFFICE.

JOHN P. IHART, OF NEW YORK, N. Y., ASSIGNOR OF ONE-HALF TO ARTHUR H. ELLIOTT, OF NEW YORK, N. Y.

WATER-HEATER.

SPECIFICATION forming part of Letters Patent No. 733,209, dated July 7, 1903.

Application filed August 28, 1902. Serial No. 121,297. (No model.)

*To all whom it may concern:*

Be it known that I, JOHN P. IHART, a citizen of the United States, and a resident of the borough of Manhattan, in the city and State of New York, have invented a new and useful Improvement in Water-Heaters, of which the following is a specification.

My invention relates to an improvement in water-heaters, and has more particularly for its object a water-heater in which the water is exposed to a source of heat at the outlet end of the heater rather than at the inlet end, as has been usual.

A further object is to provide certain improvements in the construction, form, and arrangement of the several parts whereby the products of combustion are brought into contact with the water to be heated in the reverse direction to the flow of the water.

A practical embodiment of my invention is represented in the accompanying drawings, in which—

Figure 1 is a view of the heater in side elevation; Fig. 2, a vertical central section through the same in the plane of the line D D of Fig. 3. Fig. 3 is a horizontal section taken in the plane of the line A A of Fig. 2. Fig. 4 is a horizontal section taken in the plane of the line B B of Fig. 2, and Fig. 5 is a horizontal section taken in the plane of the line C C of Fig. 2.

This present invention relates more particularly to improvements in tubular water-heaters.

The outer tubular cylinder is composed of an outer wall 1 and inner wall 2, spaced therefrom, and the bottom of the cylinder is closed by an outer bottom wall 3 and an inner bottom wall 4, which inner bottom wall is projected upward centrally within the cylinder to form a cylindrical chamber 5. The outer and inner walls 1 and 2 of the outer tubular cylinder are turned inwardly a short distance toward the center of the cylinder at the upper end thereof and are there joined. An inner tubular cylinder is located within the outer tubular cylinder concentric therewith, the outer wall of the said inner cylinder being denoted by 6 and the inner wall by 7. The upper and lower ends of this inner cylinder are left open. The outer and inner cylinders are connected by different horizontal series of radial tubes 8, extending diagonally upward from the outer cylinder to the inner cylinder, the series beginning at the bottom of the inner cylinder and extending at intervals up to a point within a short distance of the top thereof. A water-inlet pipe 9 extends upwardly through the bottom wall 3 of the outer cylinder into the cylindrical chamber 5, the top of the inlet-pipe 9 being located near the top of the said cylindrical chamber 5. An outlet 10 is provided for the water at the top of the outer tubular cylinder. The inlet and the outlet are provided with suitable cocks 11 and 12 for controlling the flow of water through the heater. A flue 13 is removably mounted on the top of the inner cylinder, which flue projects upwardly through the open end of the outer cylinder, but spaced therefrom to form an air-inlet 14 for feeding air to the source of heat. A source of heat is applied to the outlet end of the heater, which in the present instance is the top of the outer cylinder, in the following manner: An annular gas-burner 15 is supported beneath the inwardly-turned upper end of the outer cylinder by means of brackets 16. A gas-inlet 17 leads from a source of supply to the burner 15 through the air-inlet 14. The nipples or outlets for the gas in the burner 15 are so arranged that when the gas is ignited a portion of the heat will be directly against the flue 13. This will induce an upward draft through the interior of the inner cylinder, which in turn will induce a downward draft between the outer and inner cylinders. The products of combustion will thus be drawn downwardly between the two cylinders and then upwardly through the interior of the inner cylinder, thus exposing a large area of the heater to the said products of combustion.

It will be seen that by the use of this arrangement I am enabled to subject the water at the outlet end of the heater directly to the source of heat, thus causing the water to flow from the heater at its highest temperature. The products of combustion, as they pass first downwardly between the two water-cylinders and then upwardly through the interior of the inner water-cylinder, will gradually heat the water as it comes from the inlet, so that the water reaches its highest temperature at the outlet end of the heater. Moreover, the horizontal annular series of tubes 8 are also subjected to the heat from the products of combustion. By the arrangement hereinabove described it will be seen that the products of combustion are caused to flow in the opposite direction from the water.

Care should be taken to permit a sufficient admission of air, through the inlet 14, to insure a complete combustion of the gases, and care should also be exercised to leave the proper amount of space to permit the free passage of the complete products of combustion downwardly and then upwardly through the flue 13.

What I claim as my invention is—

1. A water-heater having a reservoir comprising an outer double-walled cylinder closed at its bottom and open at its top, an inner double-walled cylinder, open at both ends, spaced from the outer cylinder and in open communication therewith, a water-inlet for the reservoir and a water-outlet for the reservoir at the top thereof, a flue leading through the open top of the outer cylinder from the top of the inner cylinder and a source of heat located at the top of the reservoir in position to direct the hot products of combustion against the outlet end of the reservoir and against the said flue for inducing a downdraft between the two cylinders and the updraft through the flue and the interior of the inner cylinder.

2. A water-heater comprising an outer double-walled cylinder having a closed lower end and an open upper end, an inner double-walled cylinder spaced from the outer cylinder and in open communication therewith, said inner cylinder being open at both ends, a flue projecting upwardly from the top of the inner cylinder, the open top of the outer cylinder forming an air-inlet leading to the space between the two cylinders, and an annular burner located at the top of the outer cylinder and arranged to direct the flame against the said flue and upper end of the outer cylinder for creating an updraft through the flue and a downdraft through the upper open end of the outer cylinder and a water inlet and outlet for the reservoir.

3. A water-heater having a reservoir comprising a double-walled outer cylinder having a closed bottom and open top, a water-chamber projecting upwardly from the closed bottom and forming a water-space in open communication with the water-space of the outer cylinder, a water-inlet pipe projecting upwardly through the bottom of the cylinder into the said chamber, a water-outlet at the top of the cylinder, an inner double-walled cylinder spaced from the outer cylinder and in open communication therewith and a source of heat for the outlet end of the reservoir.

In testimony that I claim the foregoing as my invention I have signed my name, in presence of two witnesses, this 27th day of August, 1902.

JOHN P. IHART.

Witnesses:
FREDK. HAYNES,
HENRY THIEME.